United States Patent [19]
O'Connor

[11] 3,828,615
[45] Aug. 13, 1974

[54] ROLLER BAND ACTUATOR

[76] Inventor: Chadwell O'Connor, 2024 Galaxy Dr., Newport Beach, Calif. 92660

[22] Filed: Feb. 15, 1973

[21] Appl. No.: 332,900

[52] U.S. Cl. .............................................. 74/89.22
[51] Int. Cl. ......................................... F16h 27/02
[58] Field of Search ................ 74/89.22; 251/DIG. 2

[56] References Cited
UNITED STATES PATENTS
2,349,368   5/1944   Myers .......................... 251/DIG. 2
3,690,344   9/1972   Brumm .......................... 251/DIG. 2

FOREIGN PATENTS OR APPLICATIONS
1,239,901   12/1961   Germany ....................... 251/DIG. 2

OTHER PUBLICATIONS
Wilkes – Rolamite: A New Mechanical Design Concept – October 1967 – Research Report SC RR 67 656– Pages 175,176 and 200.

*Primary Examiner*—Samuel Scott
*Assistant Examiner*—Wesley S. Ratliff
*Attorney, Agent, or Firm*—Wolfe, Hubbard, Leydig, Voit and Osann, Ltd.

[57] ABSTRACT

An actuator is disclosed employing back-to-back roller band clusters coupled to a trolley in a housing chamber with the trolley having an arm extending through a slot in the housing. The band closes the slot and also closes the chamber at the locations of the clusters on either side of the arm so that the introduction of expansible gas at one end of the chamber drives the trolley to the opposite chamber end. Preferably, the band is formed of steel ribbon and is held in place by magnets. The chamber is formed of a number of housing segments so that the chamber length can be widely varied. As a modification, a backup roller can be mounted on the trolley to help resist the gas pressures.

6 Claims, 8 Drawing Figures

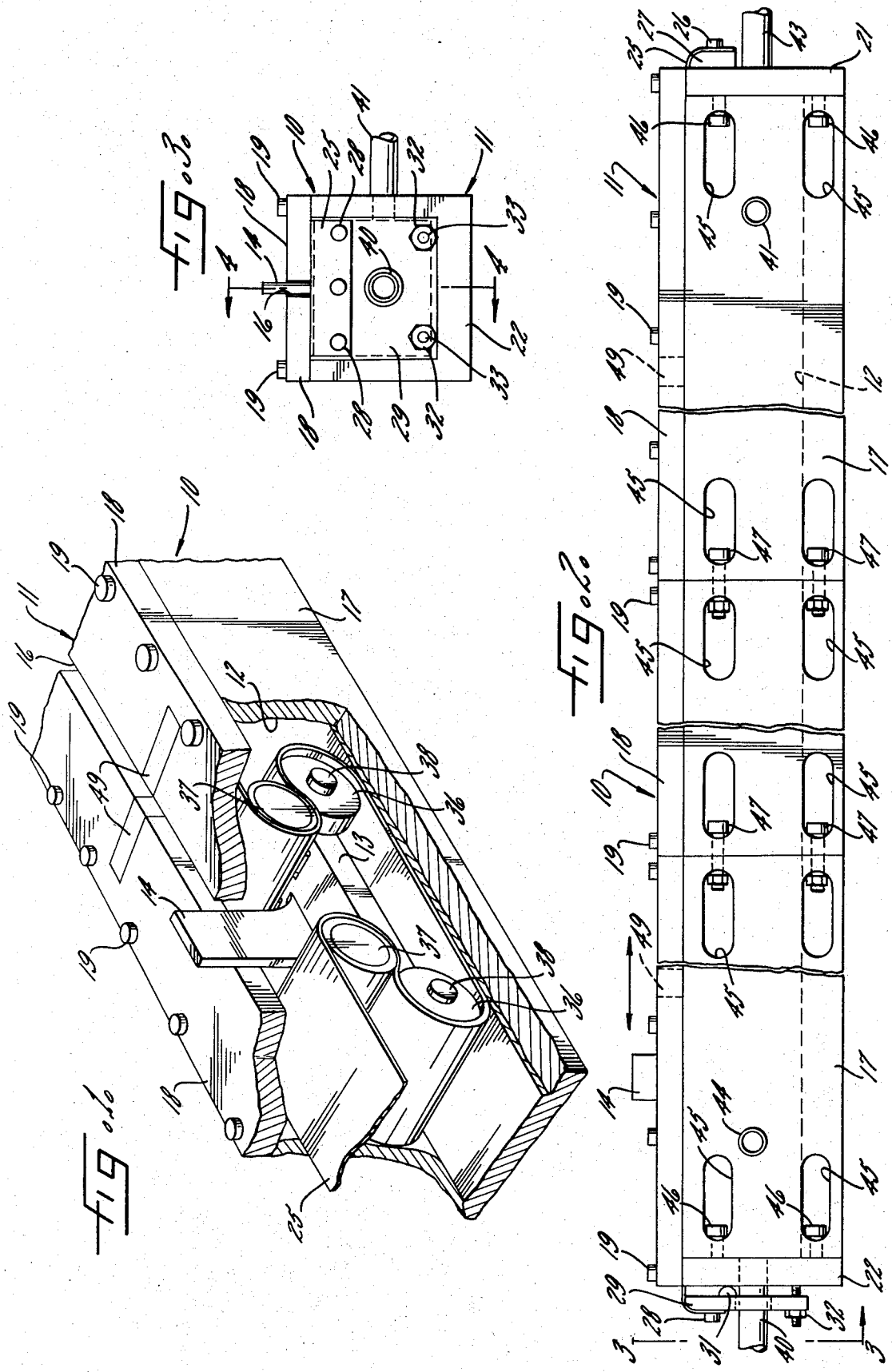

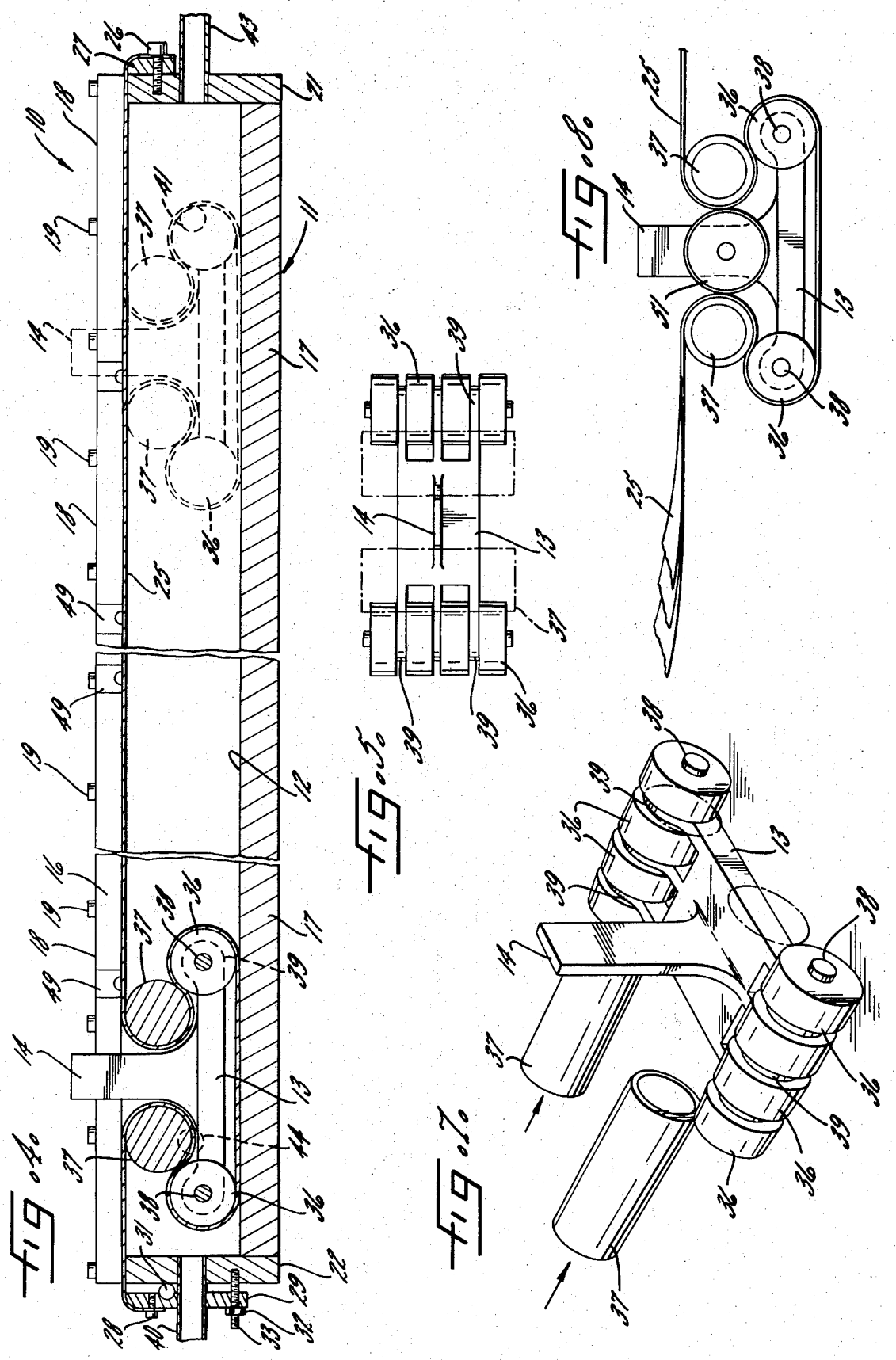

ROLLER BAND ACTUATOR

This invention relates generally to actuators and more particularly an actuator making use of the frictionless roller band principle.

Some years ago, considerable interest was generated among engineers and scientists as a result of the development of a virtually frictionless form of mechanical movement identified as a roller-band device. Some initial forms of these devices are shown in U.S. Pat. Nos. 3,452,175, 3,471,668 and 3,572,141.

In its basic form, a roller band device includes a tensioned band trained in S-fashion around a pair of rollers constrained between a pair of parallel surfaces spaced less than the combined diameters of the rollers. Rolling relative movement between the rollers and the walls is virtually frictionless, but because the confining nature of the parallel surfaces and the wrapped-around band makes it difficult to provide two anchoring points, these devices have not been generally used for transmitting force or motion.

Accordingly, it is the primary aim of the invention to provide a force generating and motion transmitting actuator using the principle of the roller-band device. It is a related object of the invention to provide an actuator of the foregoing kind which is highly efficient in that there is little frictional power loss.

Another object is to provide an actuator as characterized above which can be made up of simple subassemblies capable of being easily joined to form an actuator of widely varying length.

A further object is to provide an actuator of the above kind having an effective power stroke approximately equal to the total length of the actuator; there being no increase in actuator length through a reciprocating stroke.

It is also an object to provide an actuator of the above referred to type capable of utilizing the energy of heated or compressed gas, as well as being particularly well suited for utilizing the energy of steam.

Other objects and advantages of the invention will become apparent upon reading the following detailed description and upon reference to the drawings, in which:

FIG. 1 is a fragmentary perspective showing portions of an actuator embodying the present invention;

FIG. 2 is a fragmentary elevation of the actuator shown in FIG. 1;

FIG. 3 is an end elevation taken approximately along the line 3—3 in FIG. 2;

FIG. 4 is a transverse section taken along the line 4—4 in FIG. 3;

FIG. 5 is a plan of certain ones of the elements otherwise shown in FIG. 4;

FIG. 6 is a perspective of certain ones of the elements appearing in FIG. 1 which have been further separated for clarity;

FIG. 7 is a fragmentary elevation, partially diagrammatic, of a modification of the device otherwise illustrated; and FIG. 8 is a fragmentary side elevation of a portion of the structure shown in FIG. 1.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Turning to the drawings, there is shown an actuator 10 embodying the invention and including an elongated housing 11 defining a chamber 12 which contains a trolley 13. The trolley 13 includes an arm 14 which, with the housing 11, constitute the relatively movable elements of the actuator. The chamber 12 is rectangular in cross section and the arm 14 extends through a slot 16 running longitudinally in one housing wall from end to end of the housing. In the illustrated construction, the housing 11 is made up of U-shaped channels 17 defining three walls, and the fourth slotted wall is defined by plates 18 secured by s screws 19 to the channels. End plates 21 and 22 close the opposite ends of the housing 11.

A flexible band 25 is tensioned in the housing 11 along the slotted wall so that the band closes the slot 16. Preferably, one end of the band 25 is secured by screws 26 to the end plate 21 after being passed over a rounded edge shim 27 that avoids sharply bending the band. At its other end, the band 25 is secured by screws 28 to a rounded edge tensioning plate 29 which is rocked about a pivot cylinder 31 by tightening nuts 32 on bolts 33 anchored in the end plate 22. The nuts 32 permit substantial tension to be created in the band 25.

In accordance with the invention, two sets of rollers 36 and 37 are coupled to the trolley 13 and the band 25 is wound in an S-configuration about each set of rollers so as to create a pair of back-to-back roller-band clusters. The axes of the rollers 36, 37 are perpendicular to the longitudinal dimension of the slot 16 and parallel to the plane of the band 25, and the combined diameters of the rollers in each set is greater than the dimension of the chamber 12 from the slotted wall to the opposite wall defined by the inner bottom surface of the channels 17. Tension in the belt 25 thus urges the rollers 36, 37 firmly toward the opposed walls, and the band 25 fits closely within the side walls of the channels 17 so as to close the chamber 25 at each set of rollers on opposite sides of the arm 14.

In the construction illustrated, the rollers 36 are segmented and mounted on shafts 38 which are journalled in lugs 39 on the trolley 13, with the segments of the rollers 36 being on opposite sides of the lugs 39. The rollers 37 are floatingly carried between the rollers 36 and the arm 14 so that both roller sets are coupled to the trolley 13.

The trolley 13 and its roller-band clusters thus define a piston freely movable along the chamber 12 with little frictional resistance. To drive the trolley, a conduit 40 is passed through the end wall 22 for introducing an expansible gas into one end of the chamber 12, and a gas discharge port 41 is provided at a point spaced from the opposite end of the chamber. A gas, such as steam, introduced through the conduit 40 drives the trolley 13, which expels the air in front of the trolley through the port 41, until the trolley is driven past the port; the position shown in dashed lines in FIG. 4. Thereafter, trolley movement is arrested by the cushioning effect of the trolley compressing air in the end of the chamber adjacent the plate 21. To permit reversibility, a gas emitting conduit 43 and a discharge port 44 are arranged oppositely to the conduit 40 and the port 41. Obviously, the conduit and the port not in use must be closed, as with appropriate valves, when the actuator is driven in one direction or the other.

As a feature of the invention, the channel 17 and the plates 18 are formed so that they can be selectively removed, or increased in number, to widely change the elongated length of the chamber 12. To this end, the ends of the channels are formed with grooves 45 and longitudinal holes are formed opening into the grooves so that screws 46 in the grooves and holes releasably secure the end plates 21, 22 to the end channels. Bolts 47, likewise fitted in the grooves 45 and longitudinal holes, secure adjacent channels 17 together. An actuator of desired length can thus be assembled using the required number of similar segments.

To avoid having the band 25 pull away from the plates 18 and open the slot 16, magnets 49 are set into the plates 18 and the belt is made of magnetic material. In this way, the chamber 12 on either side of the trolley 13 remains closed with the tensioned band 25 being held in place by the magnets.

Preferably, the band 25 is formed of steel and, to establish band strength while maintaining flexibility, multiple layers of thin steel ribbon are layered to form the band (see FIG. 8). Because relative motion between the ribbons occurs as the band 25 winds about the rollers 36, 37, a lubricant or friction-reducing coating is preferably placed between the ribbon layers.

As a modification of the trolley 13 that is effective to resist band distortion because of gas pressure in the chamber 12, a backup roller 51 is mounted on the trolley 13 (see FIG. 8) with the backup roller being divided in two segments, one segment on either side of the arm 14, which segments are in rolling engagement with those portions of the band 25 passing around the roller sets. Pressure on one side of the trolley 13 acting against the band contacting one of the rollers 36 will be transmitted directly to the trolley 13 through the roller mounting shaft 38, and pressure acting against either one of the rollers 37 will be transmitted directly to the trolley 13 through the backup roller 51, without tending to further strain the band.

It can now be seen that the actuator 10 effectively embodies the roller-band principle so as to be highly efficient with little frictional loss. The actuator is quite versatile since not only can the cross section be varied to control the "piston" area, but the actuator 10 is also designed to give a wide latitude in operating length. In contrast to more conventional actuators, the effective power stroke of the actuator 10 is about equal to the total maximum actuator length. The actuator is well suited for utilizing steam as a powerful, economical energy source.

Since the actuator is capable of utilizing the potential power of steam, and is also capable of being extended so as to deliver a long stroke, a wide variety of heavy-duty applications suggest themselves including pile drivers, steam catapults, and material handling conveyors, as well as those applications more regularly associated with pneumatic or hydraulic actuators.

I claim as my invention:

1. An actuator comprising, in combination, a housing defining an elongated chamber rectangular in cross section and having a longitudinally running slot in one wall, a flexible band tensioned in said housing along said one wall so as to close the slot against gas pressures in the housing, a trolley in said chamber having an arm extending through said slot, two sets of rollers coupled to said trolley with the axes of said rollers being perpendicular to the longitudinal dimension of the slot and parallel to the plane of the band, the rollers of each set having a combined diameter greater than the dimension of said chamber from said one slotted wall to the opposite wall, said band being wound in an S-configuration about each set of rollers so that tension in the belt urges the rollers in each set firmly toward opposite walls of the chamber, said band being sufficiently wide to close said chamber at each set of rollers on opposite sides of said arm, and means for introducing an expansible gas into one end of said chamber so as to drive said trolley to the opposite end of the chamber.

2. The combination of claim 1 in which said band is formed of steel ribbon, and the combination includes magnets mounted in said slotted wall to hold the band over the slot.

3. The combination of claim 2 in which said band is formed of multiple layers of thin steel ribbon so as to establish band strength while maintaining flexibility.

4. The combination of claim 1 including a backup roller mounted on said trolley in rolling engagement with those band portions passing around said roller sets so as to provide resistance to band distortion because of gas pressure in the chamber.

5. The combination of claim 1 including a gas discharge port spaced from said opposite end of said chamber so that, once said trolley is driven past said discharge port, trolley movement is arrested by the cushioning effect of compressing gas in said opposite end of the chamber.

6. The combination of claim 1 in which said housing is made up of a plurality of segments that can be selectively removed or increased in number to change the elongated length of said chamber.

* * * * *